United States Patent
Breedy

(10) Patent No.: US 11,211,748 B2
(45) Date of Patent: Dec. 28, 2021

(54) NETWORK PORT CONNECTOR EJECTION SYSTEM

(71) Applicant: Dell Products L.P., Round Rock, TX (US)

(72) Inventor: Andrew Breedy, Mitchelstown (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/806,171

(22) Filed: Mar. 2, 2020

(65) Prior Publication Data

US 2021/0273379 A1    Sep. 2, 2021

(51) Int. Cl.
*H01R 13/633*    (2006.01)
*H01R 13/627*    (2006.01)
*H04L 12/931*    (2013.01)

(52) U.S. Cl.
CPC ....... *H01R 13/633* (2013.01); *H01R 13/6272* (2013.01); *H04L 49/40* (2013.01); *H01R 2201/04* (2013.01)

(58) Field of Classification Search
CPC .......... G06K 13/0806; G06K 13/0856; H01R 13/633; H01R 13/635; H01R 13/6205; H01R 13/703
USPC ................. 439/159, 157, 352, 258; 361/754
See application file for complete search history.

(56) References Cited

U.S. PATENT DOCUMENTS

| | | | | |
|---|---|---|---|---|
| 3,594,694 A * | 7/1971 | Clark | ................... | H01R 13/635 439/131 |
| 4,383,315 A * | 5/1983 | Torng | ..................... | H04L 12/43 370/452 |
| 4,387,441 A * | 6/1983 | Kocol | ................ | H04B 10/2725 710/3 |
| 4,404,557 A * | 9/1983 | Grow | .................... | H04L 12/433 370/455 |
| 5,818,691 A * | 10/1998 | McMahan | .......... | H01R 13/6275 361/679.43 |
| 5,890,920 A * | 4/1999 | David | .................... | G06K 13/08 439/159 |
| 6,208,044 B1 * | 3/2001 | Viswanadham | ..... | G06K 7/0047 310/12.04 |
| 6,244,889 B1 * | 6/2001 | James | .................. | H01R 13/641 439/352 |
| 6,364,709 B1 * | 4/2002 | Jones | ................. | H01R 13/6594 439/607.2 |

(Continued)

*Primary Examiner* — Faisal M Zaman
(74) *Attorney, Agent, or Firm* — Joseph Mencher

(57) ABSTRACT

A network port connector ejection system includes a computing device connector that is connected to a network port connector. A retention device in the network port connector ejection system is configured to engage the network port connector to secure the network port connector to the computing device connector. A retention device release subsystem in the network port connector ejection system is coupled to the retention device and is configured to be actuated to release the retention device from engagement with the network port connector. A network port connector ejection subsystem in the network port connector ejection system is configured to engage the network port connector, while the retention device release subsystem is actuated to release the retention device from engagement with the network port connector, to disconnect the network port connector from the computing device connector.

17 Claims, 18 Drawing Sheets

(56) References Cited

U.S. PATENT DOCUMENTS

| | | | | |
|---|---|---|---|---|
| 6,430,053 B1* | 8/2002 | Peterson | H01R 13/6335 | 361/728 |
| 6,439,918 B1* | 8/2002 | Togami | G02B 6/4246 | 439/372 |
| 6,454,589 B1* | 9/2002 | Yeh | H01R 13/6275 | 200/51 R |
| 6,473,816 B1* | 10/2002 | Yoshida | G06F 9/5011 | 710/113 |
| 9,723,756 B1* | 8/2017 | Masters | H05K 7/20709 | |
| 2001/0008812 A1* | 7/2001 | Nishioka | G06K 13/0856 | 439/157 |
| 2004/0121643 A1* | 6/2004 | Roth | G02B 6/3897 | 439/352 |
| 2005/0114515 A1* | 5/2005 | Droms | H04L 61/2053 | 709/227 |
| 2006/0095538 A1* | 5/2006 | Rehman | H04L 67/142 | 709/217 |
| 2010/0112845 A1* | 5/2010 | Lam | H01R 13/6275 | 439/352 |
| 2013/0223308 A1* | 8/2013 | Chandra | H04W 52/028 | 370/311 |
| 2013/0295782 A1* | 11/2013 | Goel | H01R 13/703 | 439/40 |
| 2014/0021915 A1* | 1/2014 | Staley | B60L 53/18 | 320/109 |
| 2015/0018041 A1* | 1/2015 | Gorilovsky | G06F 1/1626 | 455/558 |
| 2015/0180174 A1* | 6/2015 | Hirashima | H01R 12/73 | 439/157 |
| 2019/0363477 A1* | 11/2019 | Wu | H01R 13/4538 | |
| 2021/0129696 A1* | 5/2021 | Westfall | H02J 7/0045 | |

\* cited by examiner

NETWORK PORT CONNECTOR EJECTION SYSTEM

BACKGROUND

The present disclosure relates generally to information handling systems, and more particularly to ejecting network port connectors from information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, may include server/computing device ports that are configured to connect to a network via network port connectors that are coupled to network cables. For example, Small Form-factor Pluggable (SFP) transceiver devices are often connected to server device ports on server devices, with network cables that are coupled to a network also connected to the SFP transceiver devices in order to provide network connectivity for the server devices. However, such network connectivity can raise some issues such as, for example, when server devices are compromised by viruses or hacking attempts, when unauthorized server devices are connected to a datacenter network, and/or in other situations that would be apparent to one of skill in the art. In such situations, it may be desirable to disconnect a compromised or unauthorized server device from the network, but many server devices are located in remote datacenters. As such, the physical disconnection of the server device from the network via the physical disconnection of an SFP transceiver device from the server device port on the server device may not be an immediate option, and may require a network administrator or other user to be physically present at the server device in order to disconnect the SFP transceiver device. One solution to such issues is to remotely power off compromised or unauthorized server devices, but the powering off of a server device is associated with risks such as, for example, the inability of the powered-off server device to subsequently boot or initialize correctly, and operates to prevent a network administrator or other user from subsequently troubleshooting the server device remotely.

Accordingly, it would be desirable to provide a network port connector system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a network port connector ejection engine that is configured to: receive an instruction to eject a network port connector that is connected to a computing device connector; actuate, in response to receiving the instruction to eject the network port connector, a retention device release subsystem that is coupled to a retention device to release the retention device from engagement with the network port connector; and actuate, in response to receiving the instruction to eject the network port connector, a network port connector ejection subsystem to engage the network port connection ejection subsystem with the network port connector, while the retention device release subsystem is actuated to release the retention device from engagement with the network port connector, to disconnect the network port connector from the computing device connector.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
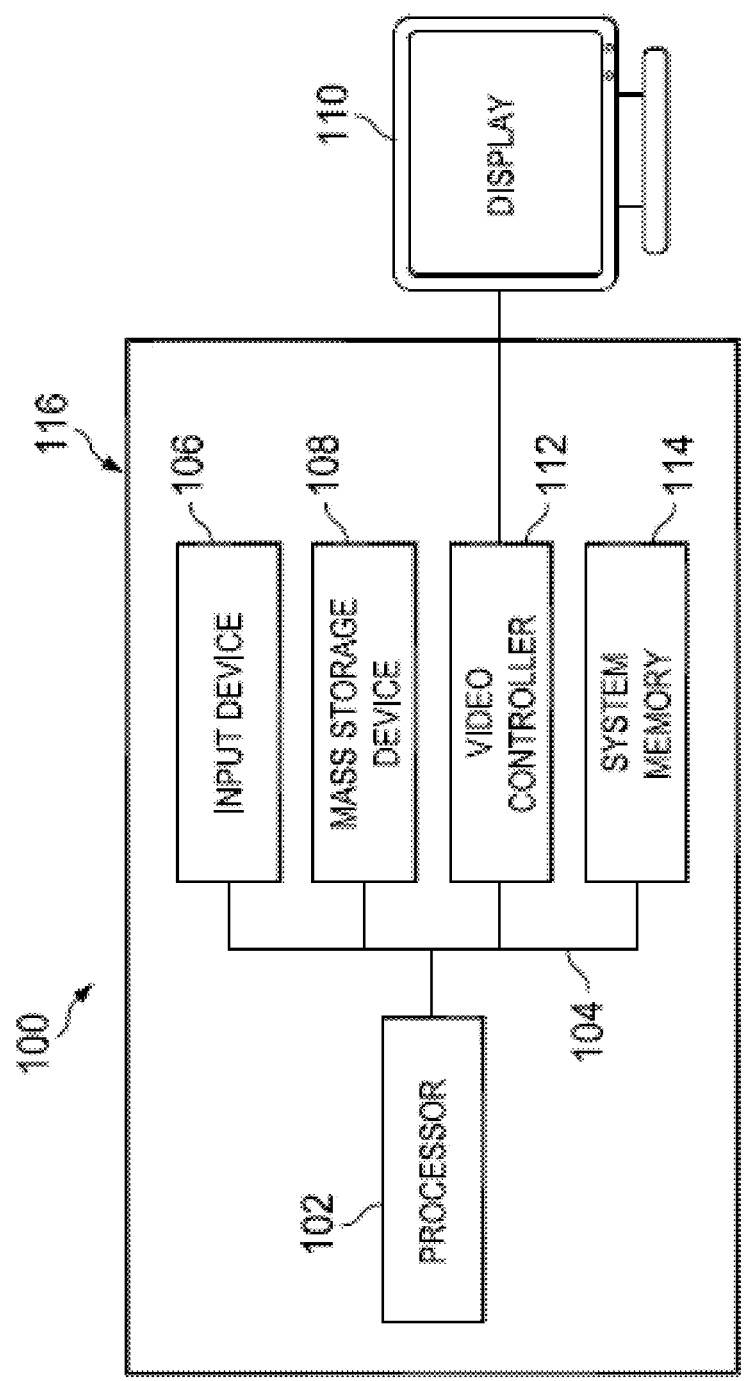
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
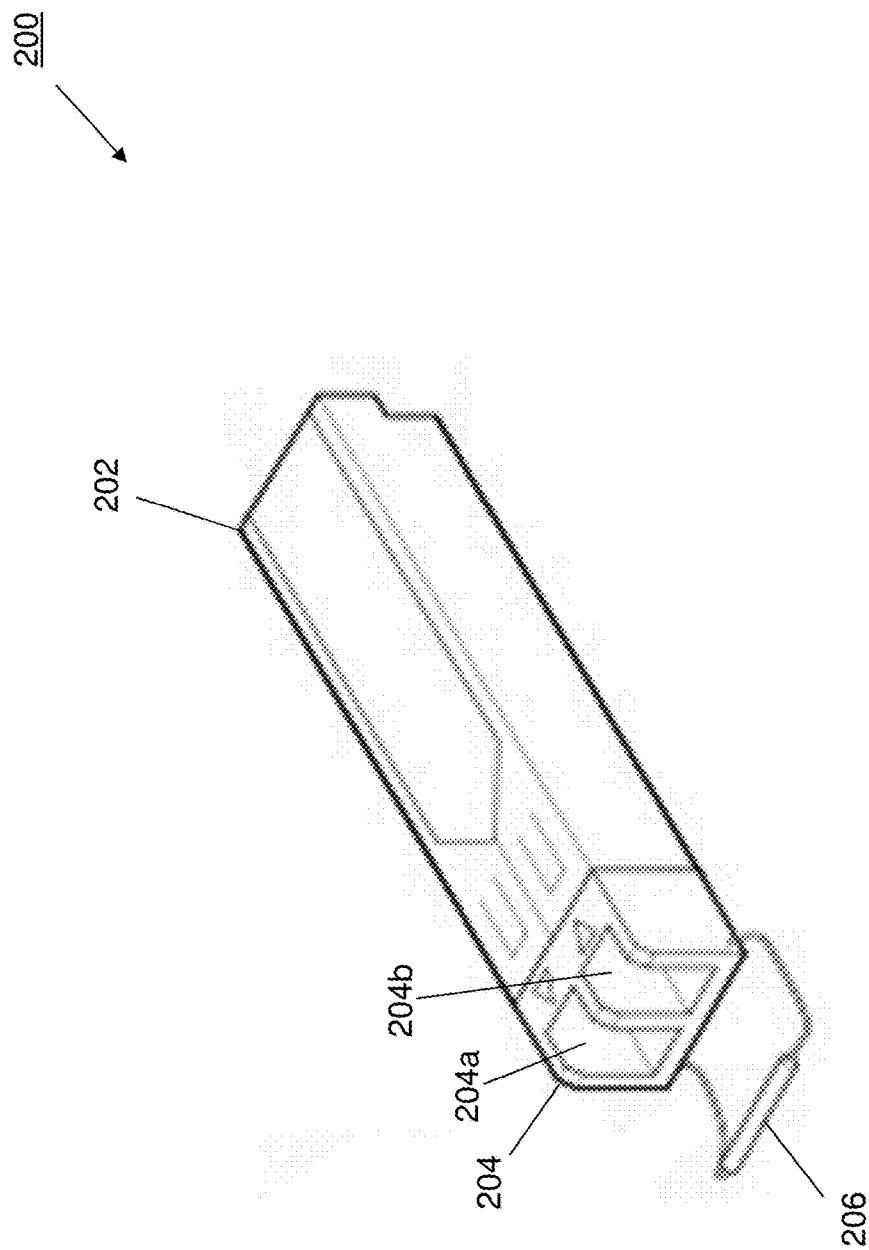
FIG. 2A is a perspective view illustrating an embodiment of a network port connector device.
Figure 2B:
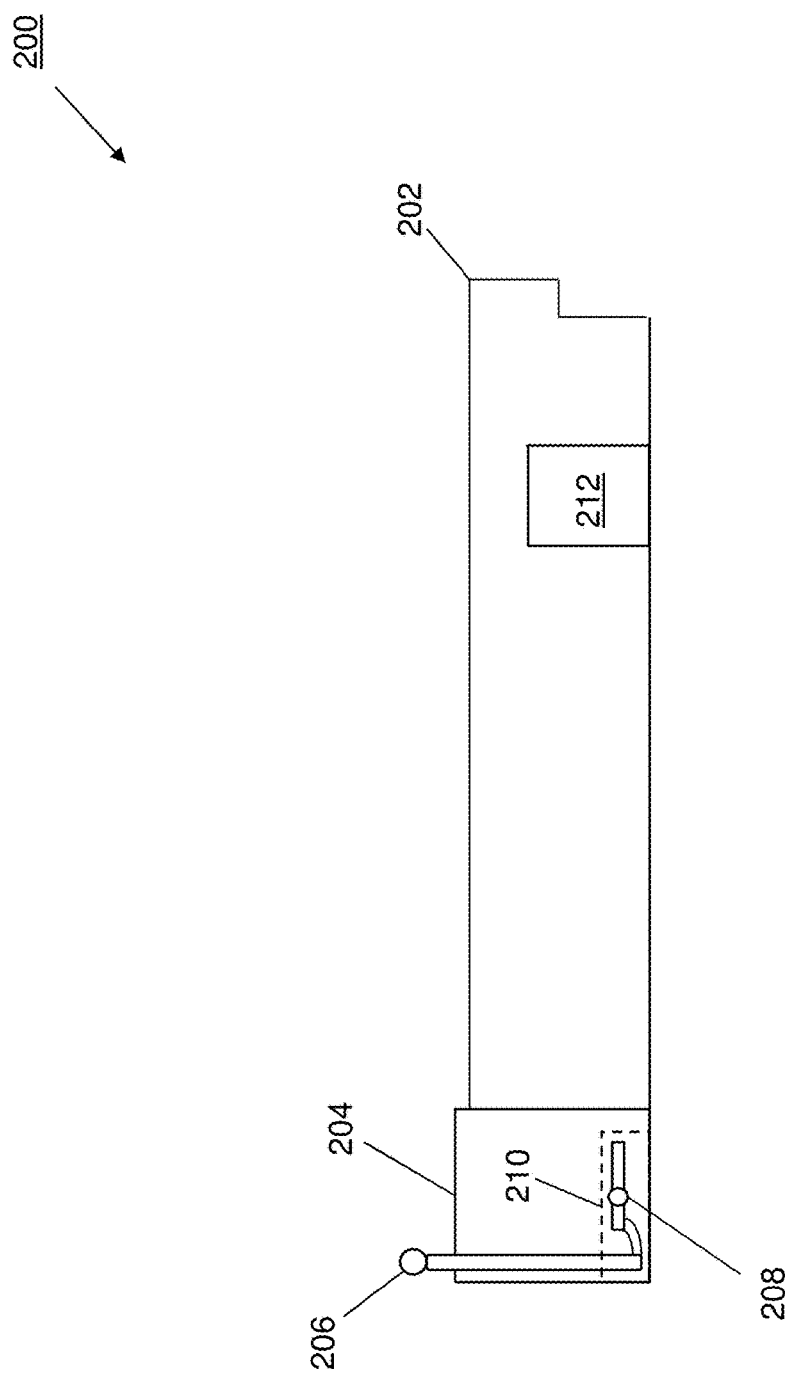
FIG. 2B is a schematic view illustrating an embodiment of the network port connector device of FIG. 2A.

Referring now to FIGS. 2A and 2B, an embodiment of a network port connector device 200 is illustrated. One of skill in the art in possession of the present disclosure will recognize that, in the illustrated embodiment, the network port connector device 200 is provided by a Small Form-factor Pluggable (SFP) transceiver device. However, while illustrated and discussed as being provided by an SFP transceiver device, one of skill in the art in possession of the present disclosure will recognize that network port connector devices provided in the network port connector ejection system of the present disclosure may include any network port connector devices that may be configured to operate similarly as the network port connector device 200/SFP transceiver device discussed below.

In the embodiment illustrated in FIGS. 2A and 2B, the network port connector device 200 includes a base 202 that may house the components of the network port connector device 200, which one of skill in the art in possession of the present disclosure will appreciate may include processing systems, memory systems, storage systems, communication systems, and/or any network port connector device/SFP transceiver device components known in the art. A cable connector end 204 on the network port connector device 200 defines cable connector slots 204a and 204b, each of which is configured to receive a cable connector and allow that cable connector to engage a device connector included in the base 202 (e.g., as part of the communication system discussed above.) A release element 206 is included on the cable connector end and, in the illustrated embodiment, is coupled to a release subsystem 208 that is located in a channel 210 defined by the cable connector end 206, as illustrated in FIG. 2B. FIG. 2B also illustrates how the base 202 may house a network port connector 212 that one of skill in the art in possession of the present disclosure will recognize may be included as part of the communication system discussed above, and may be coupled to any or all of the components (e.g., the processing system discussed above) housed in the base 202. However, while a specific network port connector on a network port connector device 200 has been illustrated and described in FIGS. 2A and 2B, one of skill in the art in possession of the present disclosure will recognize that network port connectors utilized in the present disclosure may include a variety of network port connectors while remaining within the scope of the present disclosure as well.

Figure 3:
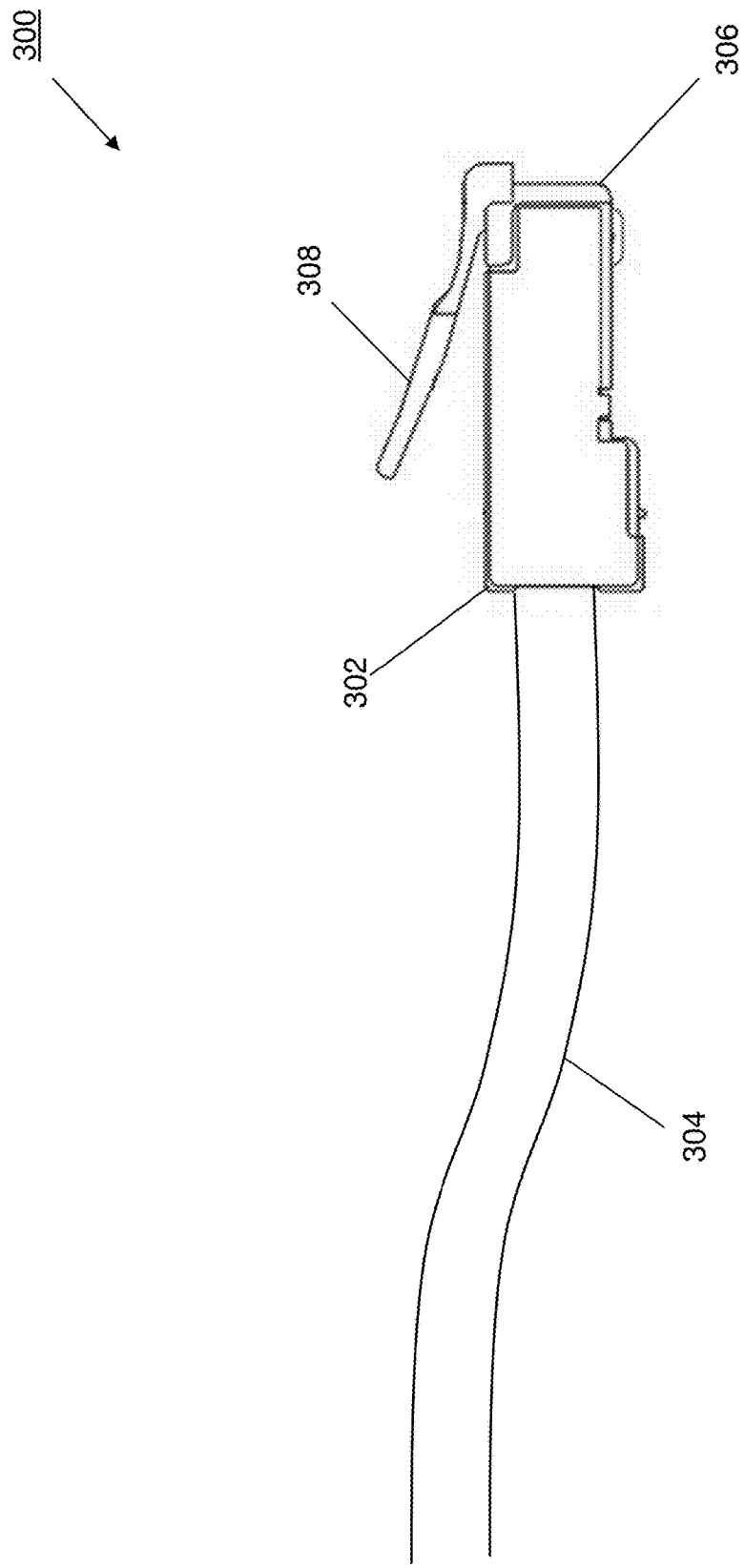
FIG. 3 is a schematic view illustrating an embodiment of a network port connector system.

For example, FIG. 3 illustrates an embodiment of a network port connector system 300 that one of skill in the art in possession of the present disclosure will recognize is provided by an Ethernet cabling system. However, while illustrated and discussed as being provided by an Ethernet cabling system, one of skill in the art in possession of the present disclosure will recognize that network port connector systems provided in the network port connector ejection system may include any network port connector system that may be configured to operate similarly as the network port connector system 300/Ethernet cabling system discussed below. In the embodiment illustrated in FIG. 3, the network port connector system 300 includes a base 302 that may house some of the components of the network port connector system 300, which one of skill in the art in possession of the present disclosure will appreciate may include a variety of communication system components and/or any network port connector system/Ethernet cabling system components known in the art. A cable 304 extends from the base 302 of the network port connector system 300, and may be provided by a variety of Ethernet cabling (e.g., CAT5 cabling and/or other cabling known in the art.) A network port connector 306 is included on the base 302 opposite the base 302 from the cable 304, and a retention member 308 extends from the base 302 opposite the base 302 from the cable 304 as well.

Furthermore, while two specific examples of devices and systems are described herein that provide network port connectors that may be utilized with the network port connector ejection system of the present disclosure, one of skill in the art in possession of the present disclosure will appreciate that other devices and systems such as network cards, network daughter cards, and/or other networking systems will benefit from the teachings of the present disclosure as well. Furthermore, while the discussion herein is focused on networking functionality provided via network port connections, one of skill in the art will appreciate that the teachings of the present disclosure may be applied to connectors that provide a connection to systems other than a network while remaining within the scope of the present disclosure as well.

Figure 4:
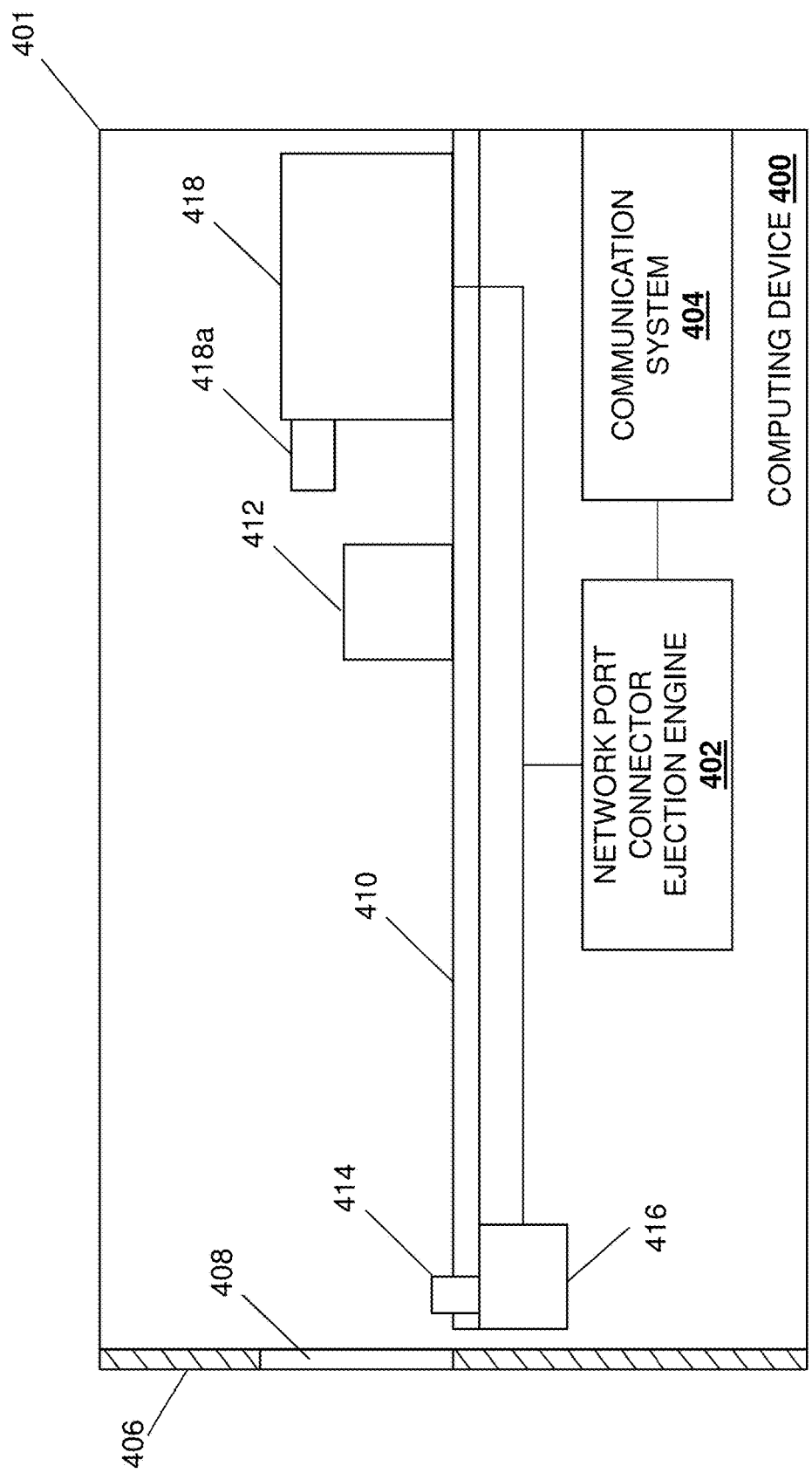
FIG. 4 is a schematic view illustrating a computing device that may be coupled to the network port connector device of FIGS. 2A and 2B.

Referring now to FIG. 4, an embodiment of a computing device 400 is illustrated that may provide the network port connector ejection system of the present disclosure. In an embodiment, the computing device 400 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 400 discussed below may be provided by other devices that are configured to operate similarly as the computing device 400 discussed below (e.g., storage systems, switch devices and/or other networking devices, and/or any other devices including network ports.) In the illustrated embodiment, the computing device 400 includes a chassis 401 that houses the components of the computing device 400, only some of which are illustrated below. For example, the chassis 401 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a network port connection ejection engine 402 that is configured to perform the functionality of the network port connection ejection engines and/or computing devices discussed below. In some examples, the network port ejection engine 402 may be provided by a dedicated software program (e.g., that may be remotely operated), a management utility program, via a remote access controller interface (as discussed below), and/or in a variety of other manners that would be apparent to one of skill in the art in possession of the present disclosure. Furthermore, one of skill in the art in possession of the present disclosure will appreciate that the network port ejection engine 402 may include firmware and, in some cases, electronics that are configured to operate and monitor the state of the network port connector ejection system.

As illustrated, the chassis 400 may also house a communication system 404 that is coupled to the network port connection ejection engine 402 (e.g., via a coupling between the communication system 404 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. In a specific example, the computing device 400 may include a remote access controller such as a Baseboard Management Controller (BMC) like the integrated DELL® Remote Access Controller (iDRAC) available from DELL® Inc. of Round Rock, Tex., United States, and the remote access controller may include the network port connection ejection engine 402, along with the communication system 404 illustrated in FIG. 4 that may be coupled to a secure management network that allows for secure management of the computing device 400. However, one of skill in the art in possession of the present disclosure will appreciate that remote access controllers may be provided outside of a chassis of a computing device, and thus the network port connection ejection engine 402 and communication system 404 may be located outside of the chassis 401 while remaining within the scope of the present disclosure as well.

In the embodiment illustrated in FIG. 4, the computing device 400 includes a wall 406 defining a network port connector device slot 408, and a board 410 (e.g., a circuit board or motherboard) is located in the chassis 401 adjacent the network port connector device slot 408. A computing device connector 412 in mounted to the board 410, and one of skill in the art in possession of the present disclosure will recognize that the computing device connector 412 may be coupled to components of the computing device 400 (e.g., the processing system, memory system, and/or other components discussed above) via traces that extend through the board, via cabling, and/or via other coupling subsystems known in the art. A retention device 414 is included on or coupled to the board 410, and in some of the embodiments discussed below the retention device may include and/or be fabricated from a metal material. For example, the retention device 414 may be provided by a spring-biased metal latch that is configured to secure the network port connector device 200 in the network port connector device slot 408, although one of skill in the art in possession of the present disclosure will appreciate that a variety of different types of retention devices will fall within the scope of the present disclosure as well. In the illustrated embodiment, a retention device release subsystem 416 is located adjacent the retention device 414 and coupled to the network port connector ejection engine 402 (e.g., via a coupling between the retention device release subsystem 416 and the processing system in the remote access controller discussed above). In a specific example, the retention device release subsystem 416 may be provided by an electromagnet subsystem that is mounted to the board 410 opposite the retention device 414, although one of skill in the art in possession of the present disclosure will appreciate that a variety of mechanisms may be utilized to release the retention device 414 (an example of which is described below) while remaining within the scope of the present disclosure.

A network port connector ejection subsystem 418 is mounted to the board 410 and located adjacent the computing device connector 412. In the illustrated embodiment, the network port connector ejection subsystem 418 includes a network port connector ejection member 418a that is moveable relative to the network port connector ejection subsystem 418 and towards the computing device connector 412 as discussed in further detail below, and is coupled to the network port connector ejection engine 402 (e.g., via a coupling between the network port connector ejection member 418 and the processing system in the remote access controller discussed above). In a specific example, the network port connector ejection subsystem 418 may be provided by a solenoid subsystem (e.g., a micro-solenoid) that is mounted to the board 410 adjacent the computing device connector 412, although one of skill in the art in possession of the present disclosure will appreciate that a variety of mechanisms may be utilized to engage a network port connector (an example of which is described below) while remaining within the scope of the present disclosure. However, while a specific computing device 400 has been illustrated, one of skill in the art in possession of the present disclosure will recognize that computing devices (or other devices operating according to the teachings of the present disclosure in a manner similar to that described below for the computing device 400) may include a variety of components and/or component configurations for providing conventional computing device functionality, as well as the functionality discussed below, while remaining within the scope of the present disclosure as well.

Figure 5:
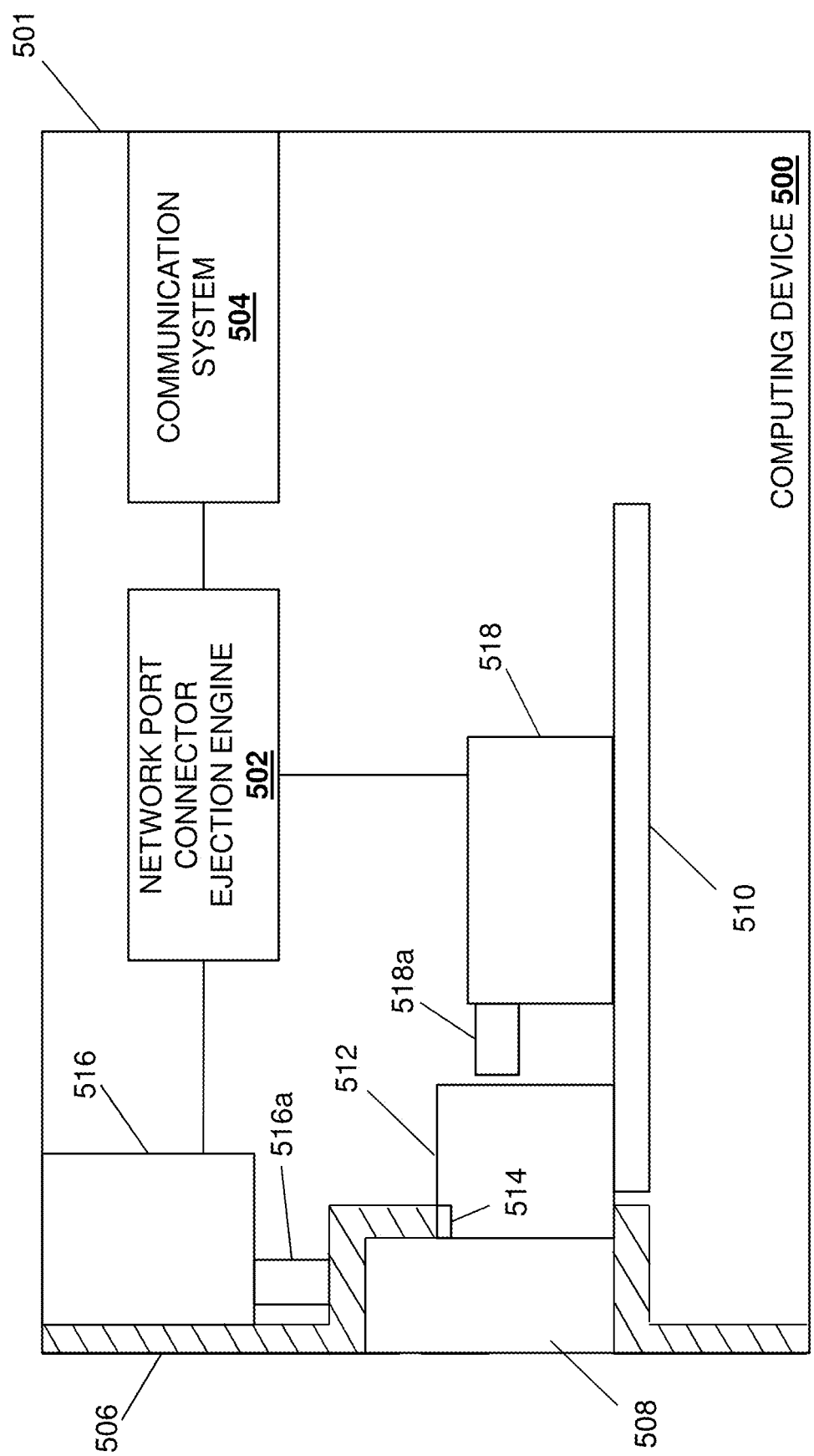
FIG. 5 is a schematic view illustrating a computing device that may be coupled to the network port connector system of FIG. 3.

Referring now to FIG. 5, an embodiment of a computing device 500 is illustrated that may provide the network port connector ejection system of the present disclosure. In an embodiment, the computing device 500 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 500 discussed below may be provided by other devices that are configured to operate similarly as the computing device 500 discussed below (e.g., storage systems, switch devices and/or other networking devices, and/or any other devices including network ports.) In the illustrated embodiment, the computing device 500 includes a chassis 501 that houses the components of the computing device 500, only some of which are illustrated below. For example, the chassis 501 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a network port connection ejection engine 504 that is configured to perform the functionality of the network port connection ejection engines and/or computing devices discussed below. In some examples, the network port ejection engine 504 may be provided by a dedicated software program (e.g., that may be remotely operated), a management utility program, via a remote access controller interface (as discussed below), and/or in a variety of other manners that would be apparent to one of skill in the art in possession of the present disclosure. Furthermore, one of skill in the art in possession of the present disclosure will appreciate that the network port ejection engine 504 may include firmware and, in some cases, electronics that are configured to operate and monitor the state of the network port connector ejection system.

As illustrated, the chassis 500 may also house a communication system 504 that is coupled to the network port connection ejection engine 502 (e.g., via a coupling between the communication system 504 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. In a specific example, the computing device 500 may include a remote access controller such as a Baseboard Management Controller (BMC) like the integrated DELL® Remote Access Controller (iDRAC) available from DELL® Inc. of Round Rock, Tex., United States, and the remote access controller may include the network port connection ejection engine 502, along with a communication system 504 illustrated in FIG. 5 that may be coupled to a secure management network that allows for secure management of the computing device 500. However, one of skill in the art in possession of the present disclosure will appreciate that remote access controllers may be provided outside of a chassis of a computing device, and thus the network port connection ejection engine 502 and communication system 504 may be located outside of the chassis 501 while remaining within the scope of the present disclosure as well.

In the embodiment illustrated in FIG. 5, the computing device 500 includes a wall 506 defining a network port connector system slot 508, and a board 510 (e.g., a circuit board or motherboard) is located in the chassis 501 adjacent the network port connector system slot 508. A computing device connector 512 in mounted to the board 510, and one of skill in the art in possession of the present disclosure will recognize that the computing device connector 512 may be coupled to components of the computing device 500 (e.g., the processing system, memory system, and/or other components discussed above) via traces that extend through the board, via cabling, and/or via other coupling subsystems known in the art. A retention device 514 is included on the wall 506/network port connector system slot 508, and in some of the embodiments discussed below may be any chassis element that one of skill in the art in possession of the present disclosure would recognize is configured to engage the retention member 308 on the network port connector system 300 to secure the base 320 in the network port connector system slot 508. In the illustrated embodiment, a retention device release subsystem 516 is located adjacent the network port connector system slot 508 and coupled to the network port connector ejection engine 502 (e.g., via a coupling between the retention device release subsystem 516 and the processing system in the remote access controller discussed above). In the illustrated embodiment the retention device release subsystem 516 includes a retention device release member 516a that is moveable relative to the retention device release subsystem 516 and into the network port connector system slot 508, as discussed in further detail below. In a specific example, the retention device release subsystem 516 may be provided by a solenoid subsystem (e.g., a micro-solenoid) that is mounted to the wall 506 opposite the outer surface of the chassis 501, although one of skill in the art in possession of the present disclosure will appreciate that a variety of mechanisms may be utilized to release the retention member 308 (an example of which is described below) while remaining within the scope of the present disclosure.

A network port connector ejection subsystem 518 is mounted to the board 510 and located adjacent the computing device connector 512. In the illustrated embodiment, the network port connector ejection subsystem 518 includes a network port connector ejection member 518a that is moveable relative to the network port connector ejection subsystem 518 and towards the computing device connector 512 as discussed in further detail below, and is coupled to the network port connector ejection engine 502 (e.g., via a coupling between the network port connector ejection member 518 and the processing system in the remote access controller discussed above). In a specific example, the network port connector ejection subsystem 518 may be provided by a solenoid subsystem (e.g., a micro-solenoid) that is mounted to the board 510 adjacent the computing device connector 512, although one of skill in the art in possession of the present disclosure will appreciate that a variety of mechanisms may be utilized to engage a network port connector (an example of which is described below) while remaining within the scope of the present disclosure. However, while a specific computing device 500 has been illustrated, one of skill in the art in possession of the present disclosure will recognize that computing devices (or other devices operating according to the teachings of the present disclosure in a manner similar to that described below for the computing device 500) may include a variety of components and/or component configurations for providing conventional computing device functionality, as well as the functionality discussed below, while remaining within the scope of the present disclosure as well.

Figure 6:
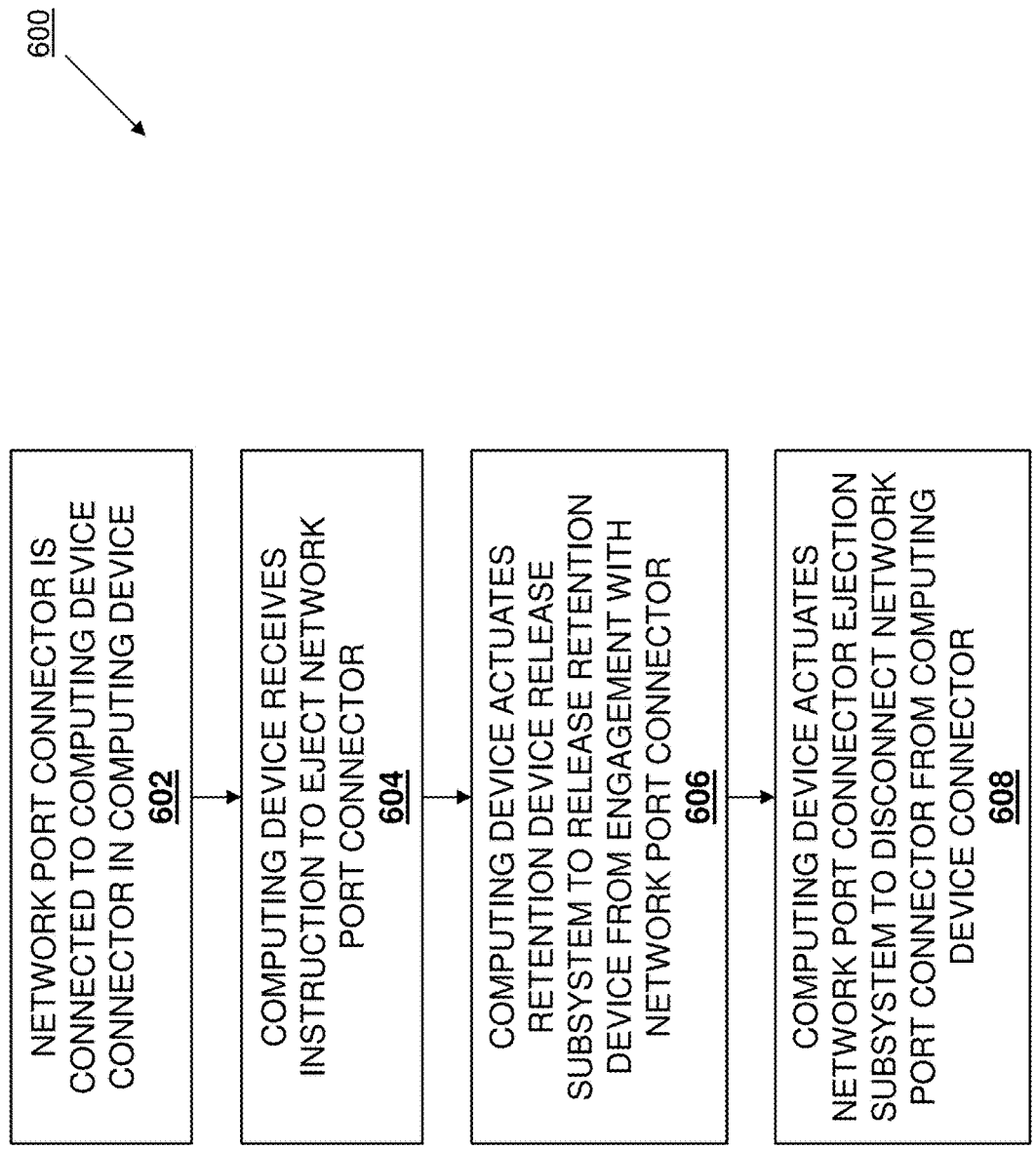
FIG. 6 is a flow chart illustrating an embodiment of a method for ejecting a network port connector.

Referring now to FIG. 6, an embodiment of a method 600 for ejecting a network port connector is illustrated. As discussed below, the systems and methods of the present disclosure provide the ability to remotely physically eject a network port connector in order disconnect that network port connector from a computing device connector in a manner that prevents reconnection of the network port connector and the computing device connector without being physically present at the computing device. For example, a computing device may include a computing device connector that is configured to connect to a network port connector, and a retention device that is configured to engage the network port connector to secure the network port connector to the computing device connector. A retention device release subsystem is provided in the computing device and coupled to the retention device, and is configured to be actuated to release the retention device from engagement with the network port connector, and a network port connector ejection subsystem is provided in the computing device and is configured to engage the network port connector (while the retention device release subsystem is actuated to release the retention device from engagement with the network port connector) to move the network port connector relative to the computing device connector in order to disconnect the network port connector from the computing device connector. As such, network access to a compromised or unauthorized computing device may be prevented in a manner that requires physical access to the computing device to regain network access, and without powering down the computing device such that remote troubleshooting of the computing device via a secure management network is available.

Figure 7A:
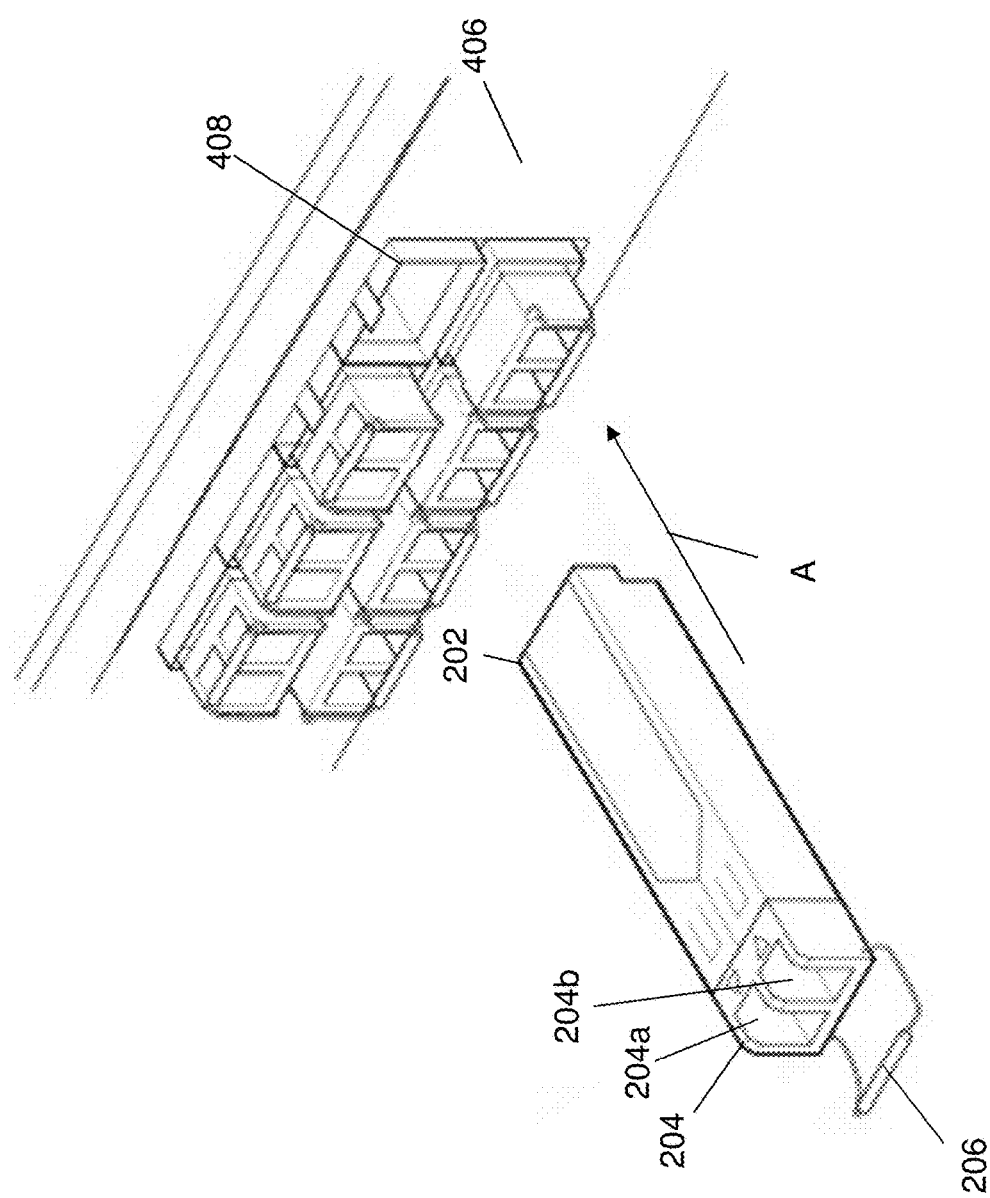
FIG. 7A is a perspective view illustrating an embodiment of the network port connector device of FIGS. 2A and 2B being connected to the computing device of FIG. 4 during the method of FIG. 6.
Figure 7B:
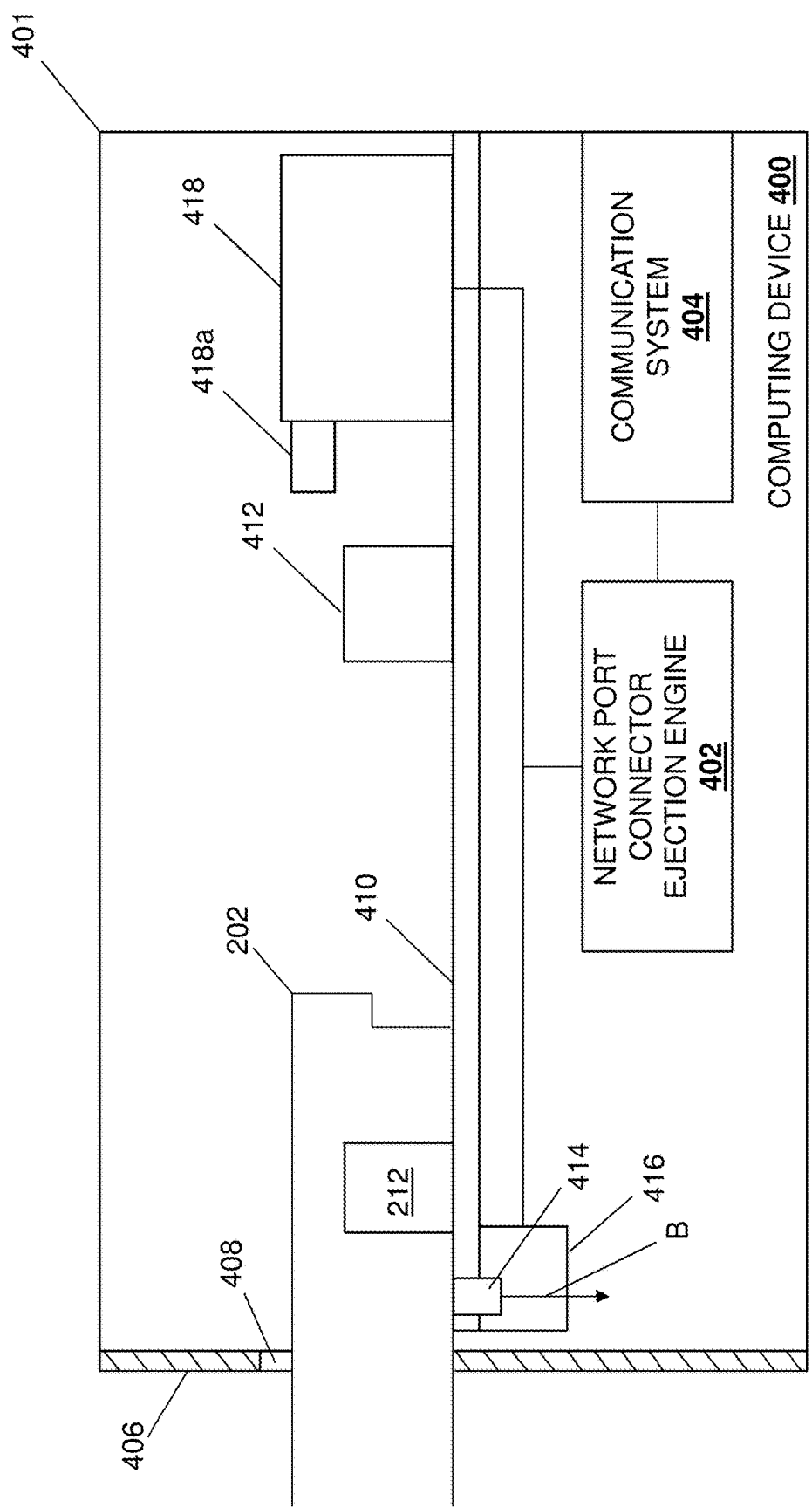
FIG. 7B is a schematic view illustrating an embodiment of the network port connector device of FIGS. 2A and 2B being connected to the computing device of FIG. 4 during the method of FIG. 6.

The method 600 begins at block 602 where a network port connector is connected to a computing device connector in a computing device. With reference to FIG. 7A, in an embodiment of block 602, the network port connector device 200 may be positioned adjacent the network port connector device slot 408 on the computing device 400 such that the network port connector 212 on the network port connector device 200 faces the network port connector device slot 408. The network port connector device 200 may then be moved in a direction A such that the base 202 of the network port connector device 200 enters the network port connector device slot 408 and moves through the network port connector device slot 408. As will be appreciated by one of skill in the art in possession of the present disclosure, the movement of the base 202 of the network port connector device 200 through the network port connector device slot 408 will cause the base 202 to engage the retention device 414 and move the retention device in a direction B, illustrated in FIG. 7B.

Figure 7C:
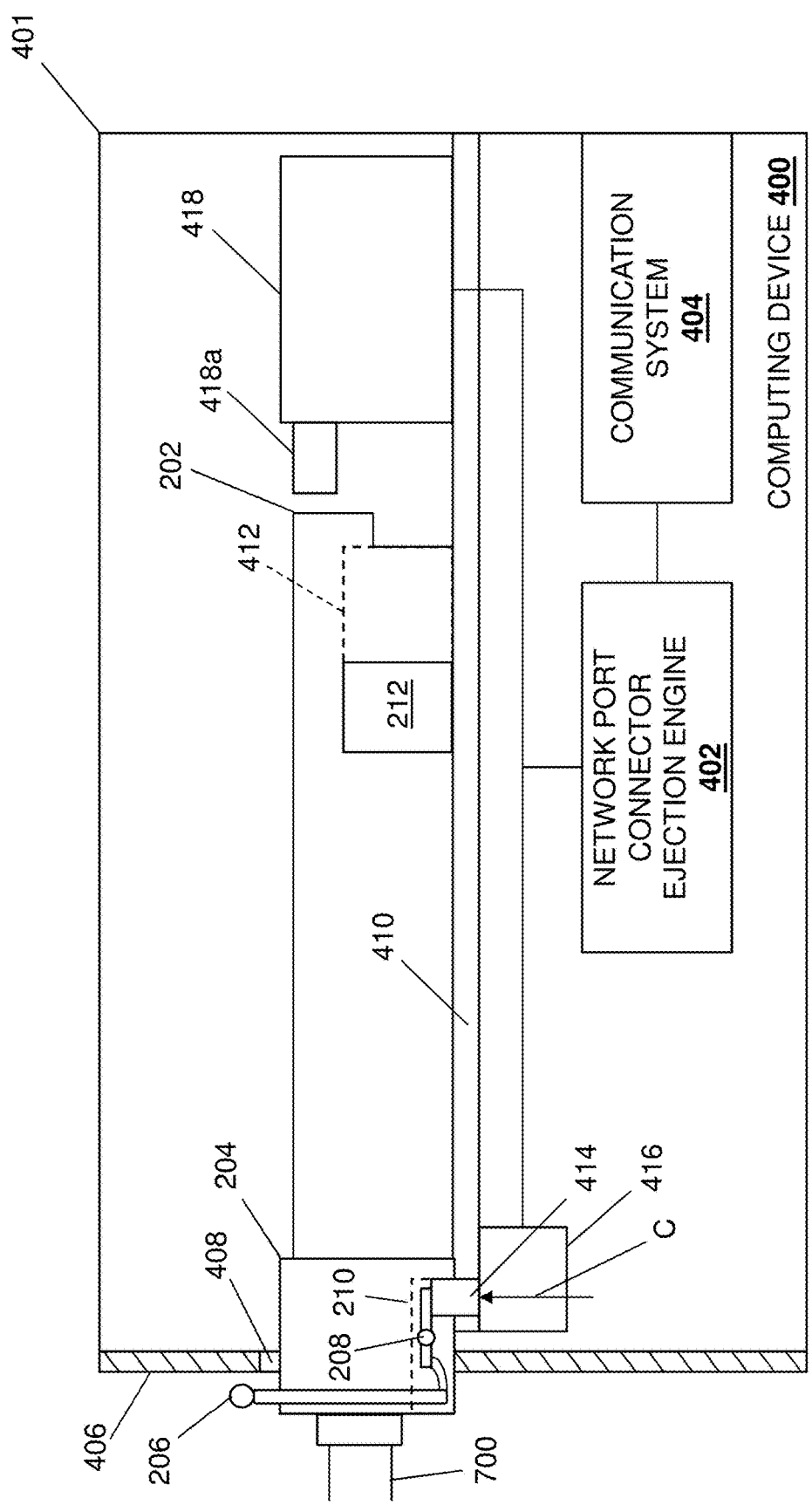
FIG. 7C is a schematic view illustrating an embodiment of the network port connector device of FIGS. 2A and 2B connected to the computing device of FIG. 4 during the method of FIG. 6.

The base 202 of the network port connector device 200 may then continue to move through the network port connector device slot 408 (i.e., in the direction A) until the network port connector 212 engages the computing device connector 412, which allows the retention device 414 to move in a direction C into the channel 210 defined by the cable connector end 206, as illustrated in FIG. 7C, in order to secure the network port connector device 200 in the network port connector device slot 408 with the network port connector 212 engaging the computing device connector 412. As also illustrated in FIG. 7C, a cable 700 that is connected to a network (e.g., a Local Area Network LAN)) may be connected to the network port connector device 200 in order to provide network access to the computing device 400. As will be appreciated by one of skill in the art in possession of the present disclosure, a network administrator or other user that is physically present at the computing device 400 may utilize the release element 206 to actuate the release subsystem 208, which operates to move the retention device 414 in the direction B and out of the channel 210, and allows for the removal of the network port connector device 200 from the network port connector device slot 408.

Figure 8A:
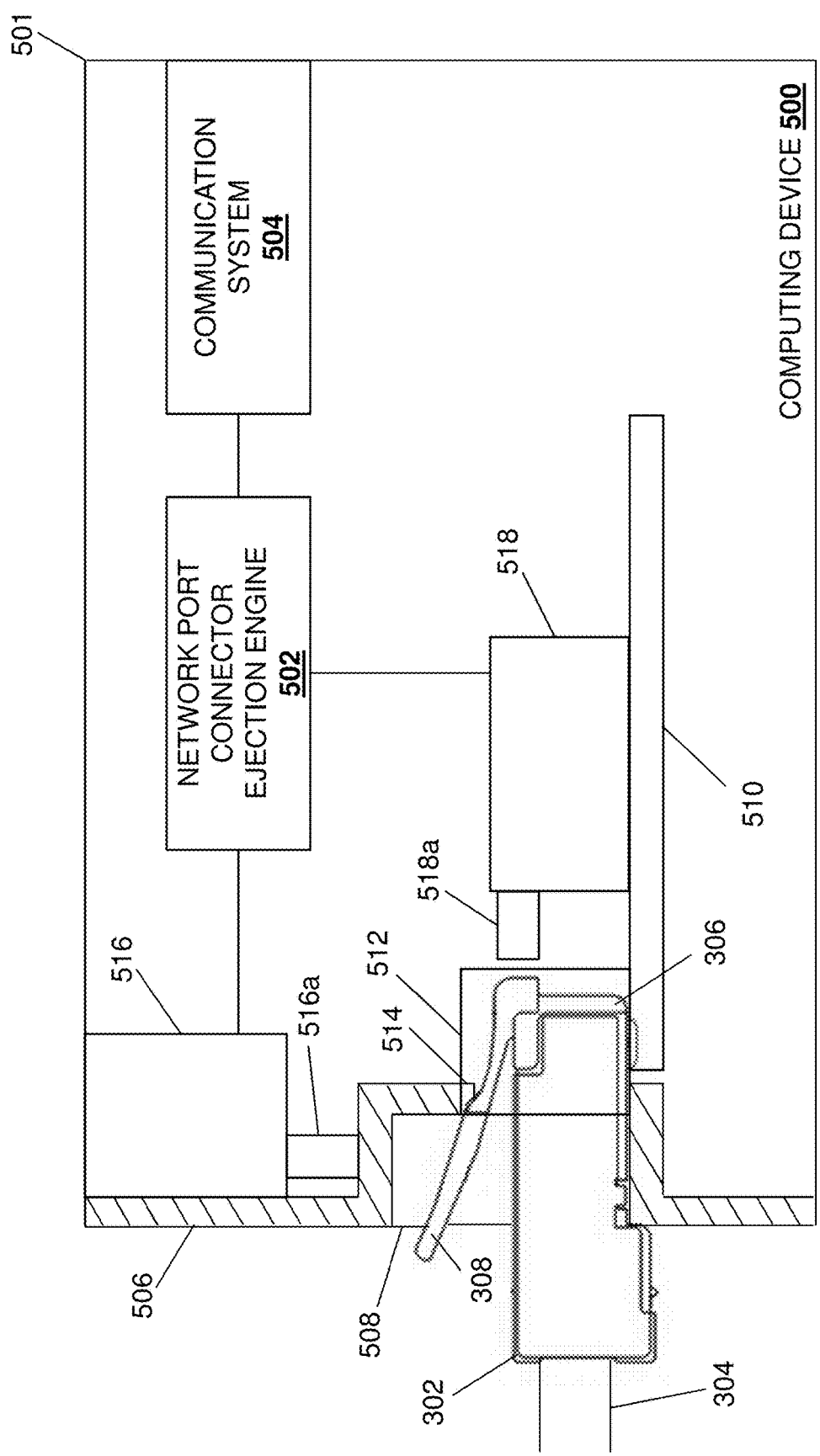
FIG. 8A is a schematic view illustrating an embodiment of the network port connector device of FIG. 3 connected to the computing device of FIG. 5 during the method of FIG. 6.

With reference to FIG. 8A, in an embodiment of block 602, the network port connector system 300 may be positioned adjacent the network port connector system slot 508 on the computing device 500 such that the network port connector 306 on the network port connector system 300 faces the network port connector system slot 508. The network port connector system 300 may then be moved through the network port connector system slot 508 such that the base 302 moves through the network port connector system slot 508. As will be appreciated by one of skill in the art in possession of the present disclosure, the movement of the base 302 of the network port connector system 300 through the network port connector system slot 508 will cause the retention member 308 on the base 302 to engage the retention device 514 on the wall 506 once the network port connector 306 has engaged the computing device connector 512, as illustrated in FIG. 8A, in order to secure the network port connector system 300 in the network port connector system slot 508 with the network port connector 306 engaging the computing device connector 512. As will be appreciated by one of skill in the art in possession of the present disclosure, a network administrator or other user that is physically present at the computing device 400 may provide a force on the retention member 308 to move the retention member 308 towards the base 302, which operates to disengage the retention member 308 from the retention device 514, and allows for the removal of the network port connector system 300 from the network port connector system slot 508.

The method 600 then proceeds to block 604 where the computing device receives an instruction to eject the network port connector. In an embodiment, at block 604, an instruction may be provided to the computing device 400 or 500 to eject the network port connector 212 or 306, respectively, in order to disconnect that network port connector 212 or 306 from the computing device connector 412 or 512, respectively. In some examples of block 604, a network administrator or other user that is remote or otherwise not physically located with the computing device 400 or 500 may determine that the computing device has had its security compromised via viruses, hacking attempts, and/or other compromised security issues known in the art and, in response, may generate and transmit an instruction to eject the network port connector 212 or 306 in order to disconnect that network port connector 212 or 306 from the computing device connector 412 or 512, respectively.

In another example, the network administrator or other user that is remote or otherwise not physically located with the computing device 400 or 500 may determine that that computing device 400 or 500 has been connected to a datacenter network without authorization (e.g., via the connection of the network port connector 212 to the computing device connector 412 on the computing device 400, or the connection of the network port connector 306 to the computing device connector 512 on the computing device 500), and, in response, may generate and transmit an instruction to eject the network port connector 212 or 306 in order to disconnect that network port connector 212 or 306 from the computing device connector 412 or 512, respectively. However, while a few specific examples have been provided, one of skill in the art in possession of the present disclosure will appreciate that the instruction to eject the network port connectors 212 or 306 in order to disconnect that network port connector 212 or 306 from the computing device connector 412 or 512, respectively, may be provided in response to any of a variety of situations that will fall within the scope of the present disclosure as well.

As such, at block 604, the network port connector ejection engine 402 may receive the instruction to eject the network port connector 212 (in order to disconnect that network port connector 212 from the computing device connector 412) via a network and through the communication system 404. Similarly, at block 604, the network port connector ejection engine 502 may receive the instruction to eject the network port connector 306 (in order to disconnect that network port connector 306 from the computing device connector 512) via a network and through the communication system 504. As will be appreciated by one of skill in the art in possession of the present disclosure, the network through which the instruction to eject the network port connectors 212 or 306 is received may be separate from the network available via the connection of the network port connector 212 and the computing device connector 412, or via the connection of the network port connector 306 and the computing device connector 512. For example, as discussed above, the communication systems 404 and 504 may be coupled to management networks, while the network port connector device 200 and the network port connector system 300 may provide connections to a Local Area Network (LAN) in a datacenter that is separate from the management network. However, while a specific example is provided, one of skill in the art in possession of the present disclosure will appreciate that the network through which the instruction to eject the network port connector is received may be provided by a variety of networks that are different than the network available via that network port connector while remaining within the scope of the present disclosure as well.

Figure 7D:
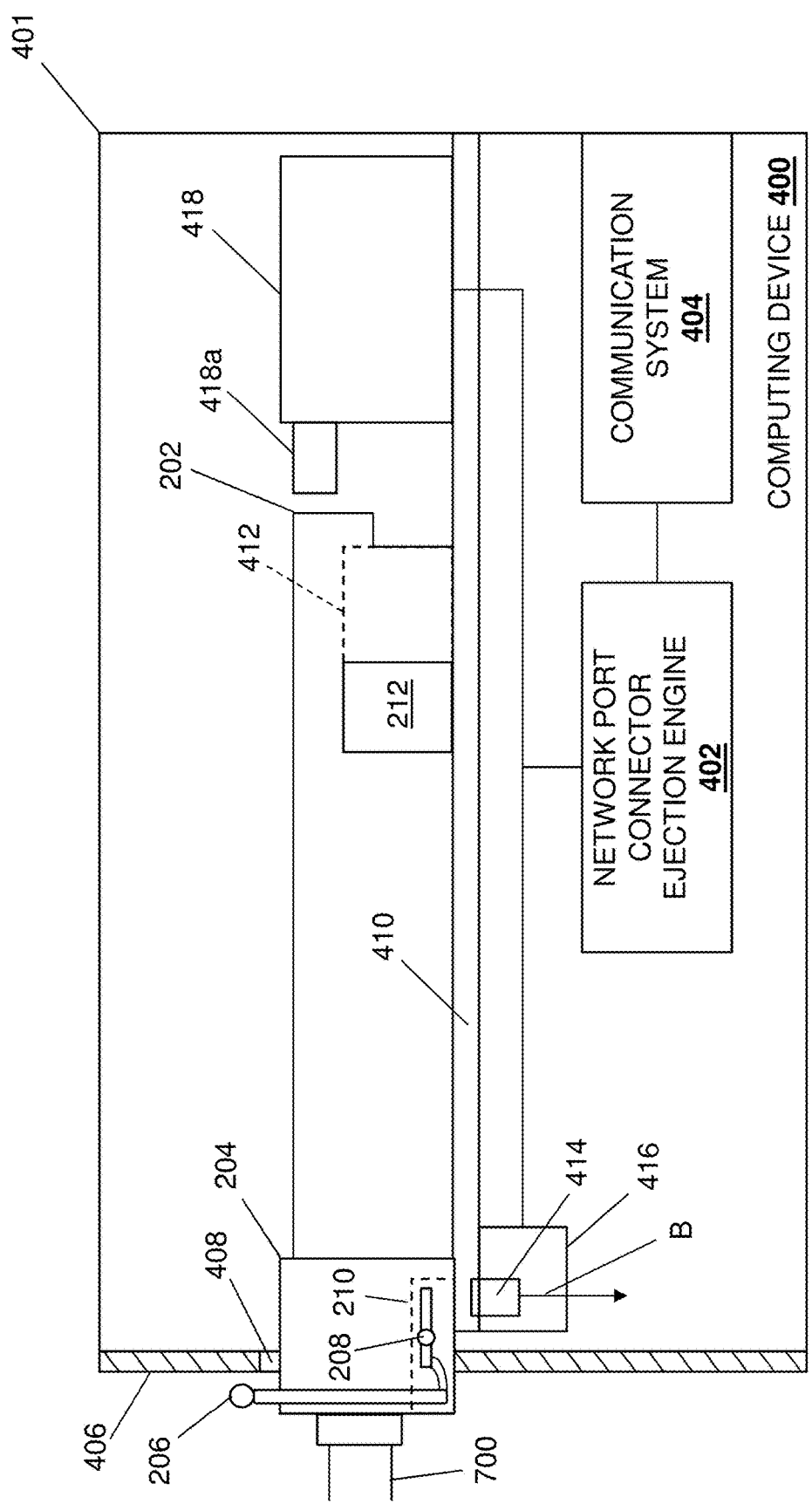
FIG. 7D is a schematic view illustrating an embodiment of the computing device of FIG. 4 operating during the method of FIG. 6 to eject the network port connector device of FIGS. 2A and 2B.

The method 600 then proceeds to block 606 where the computing device actuates a retention device release subsystem to release a retention device from engagement with the network port connector. With reference to FIG. 7D, in an embodiment of block 606 and in response to receiving the instruction to eject the network port connector 212, the network port connector ejection engine 402 may actuate the retention device release subsystem 414 to cause the retention device 414 to move in the direction B and out of the channel 210 defined by the cable connector end 206. For example, in embodiments in which the retention device release subsystem 414 is provided by an electromagnet subsystem, at block 606 the network port connector ejection engine 402 may provide power to the electromagnet subsystem included in the retention device release subsystem 414 in order to produce a magnetic force that attracts the metal material used to provide the retention device 414 (discussed above), causing the retention device 414 to move in the direction B and out of the channel 210 defined by the cable connector end 206. However, while a specific retention device release mechanism is described, one of skill in the art in possession of the present disclosure will appreciate that a variety of mechanisms may be utilized to release the retention device 414 from engagement with the network port connector device 200 while remaining within the scope of the present disclosure as well.

Figure 8B:
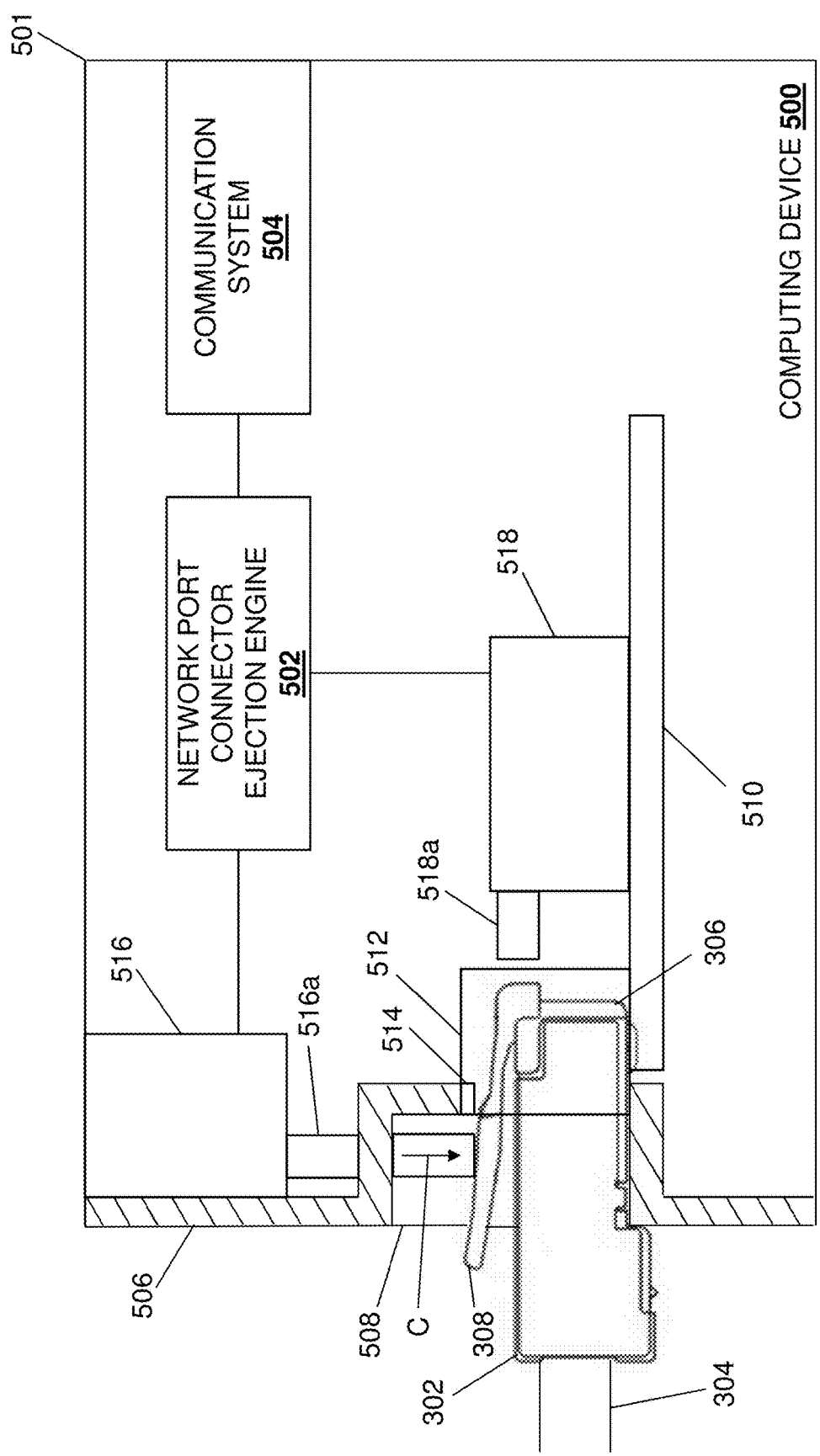
FIG. 8B is a schematic view illustrating an embodiment of the computing device of FIG. 5 operating during the method of FIG. 6 to eject the network port connector device of FIG. 3.

With reference to FIG. 8B, in an embodiment of block 606 and in response to receiving the instruction to eject the network port connector 306, the network port connector ejection engine 502 may actuate the retention device release subsystem 516 to cause the retention device release member 516a to move in a direction C and into the network port connector system slot 508. As can be seen in FIG. 8B, the movement of the retention device release member 516a into the network port connector system slot 508 causes the retention device release member 516a to engage the retention member 308 and move the release member 308 until it disengages the retention device 514. For example, in embodiments in which the retention device release subsystem 516 is provided by a solenoid subsystem, at block 606 the network port connector ejection engine 402 may provide power to the solenoid subsystem included in the retention device release subsystem 516 in order to cause the retention device release member 516a to move in the direction C and into the network port connector system slot 508 to engage the retention member 308 to disengage it from the retention device 514. However, while a specific retention device release mechanism is described, one of skill in the art in possession of the present disclosure will appreciate that a variety of mechanisms may be utilized to release the retention device 514 from engagement with the network port connector system 300 while remaining within the scope of the present disclosure as well.

Figure 7E:
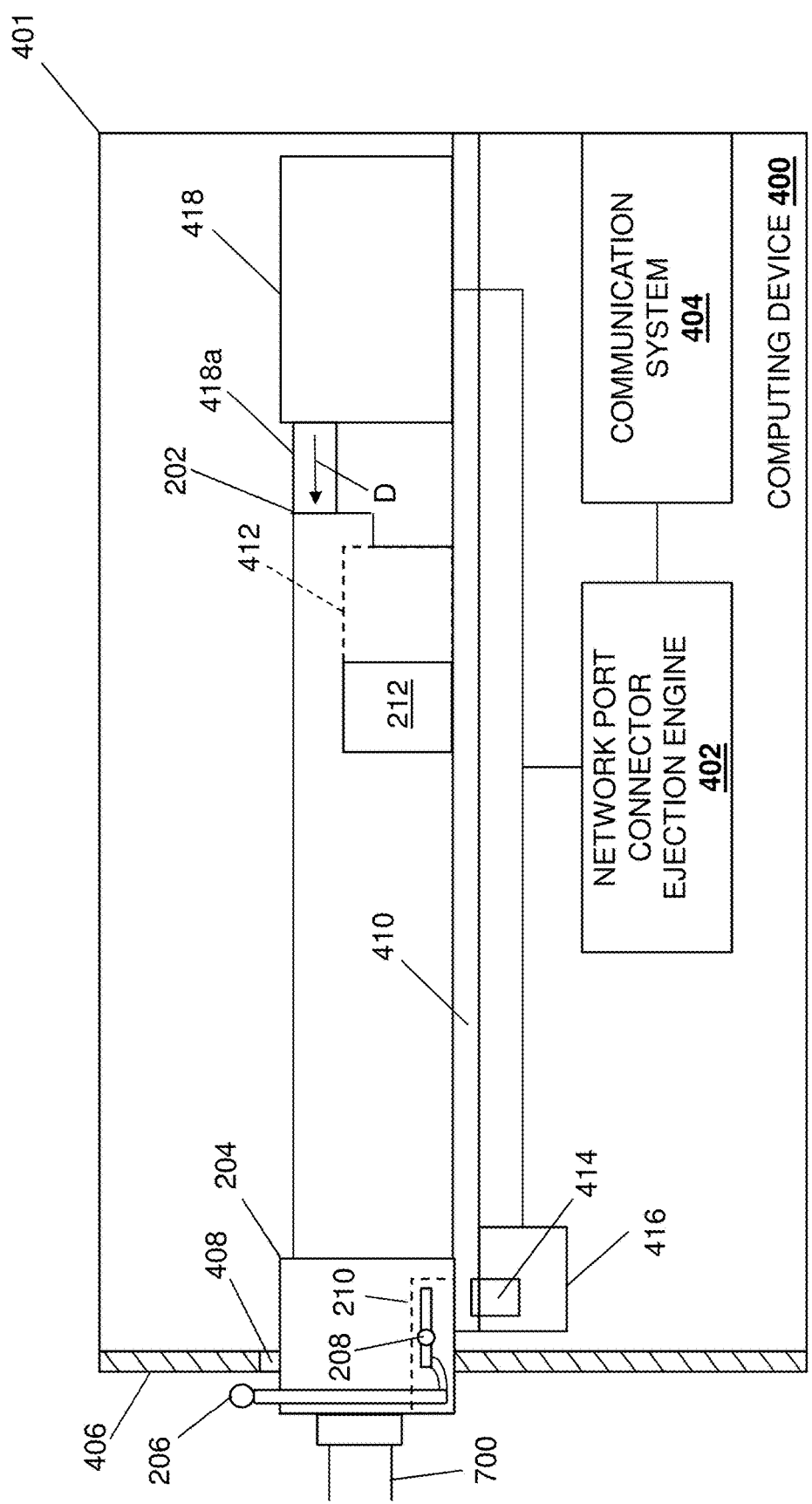
FIG. 7E is a schematic view illustrating an embodiment of the computing device of FIG. 4 operating during the method of FIG. 6 to eject the network port connector device of FIGS. 2A and 2B.
Figure 7F:
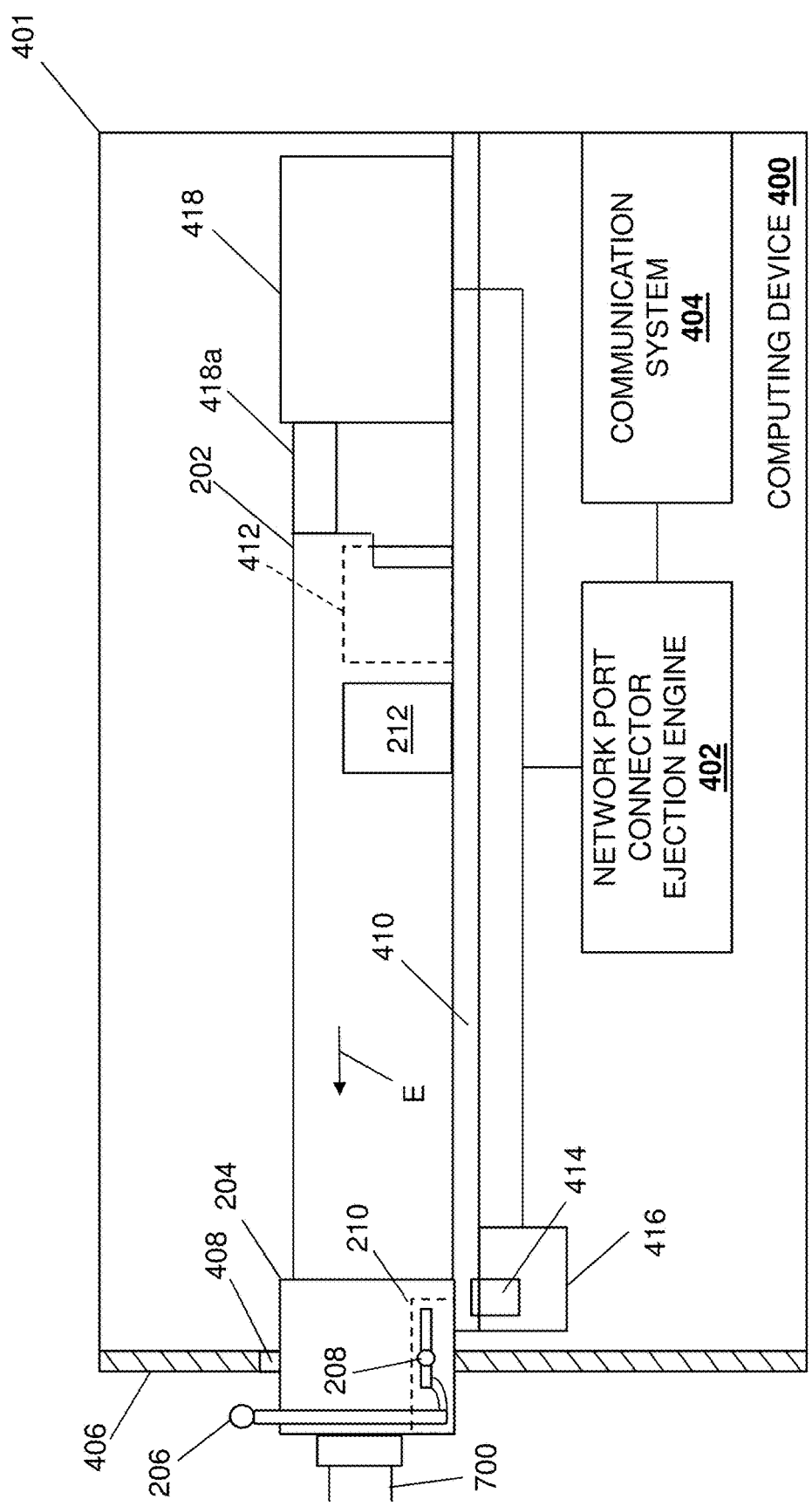
FIG. 7F is a schematic view illustrating an embodiment of the computing device of FIG. 4 operating during the method of FIG. 6 to eject the network port connector device of FIGS. 2A and 2B.

The method 600 then proceeds to block 608 where the computing device actuates a network port connector ejection subsystem to disconnect the network port connector from the computing device connector. With reference to FIG. 7E, in an embodiment of block 608, in response to receiving the instruction to eject the network port connector 212, and following the actuation of the retention device release subsystem 416 to disengage the retention device 414 from the network port connector device 200, the network port connector ejection engine 402 may actuate the network port connector ejection subsystem 418 to cause the network port connector ejection member 418a to move in a direction D and into engagement with the base 202 of the network port connector device 200. As can be seen in FIG. 7F, the engagement of the network port connector ejection member 418a with the base 202 of the network port connector device 200 and the continued movement of the network port connector ejection member 418a (i.e., in the direction D) causes the base 202 of the network port connector device 200 to move in a direction E relative to the computing device connector 412 such that the network port connector 212 is disconnected from the computing device connector 412. As will be appreciated by one of skill in the art in possession of the present disclosure, the disengagement of the retention device 414 from the network port connector device 200 allows for the movement of the network port connector device 200 in the direction E in order to disconnect the network port connector 212 from the computing device connector 412.

Figure 7G:
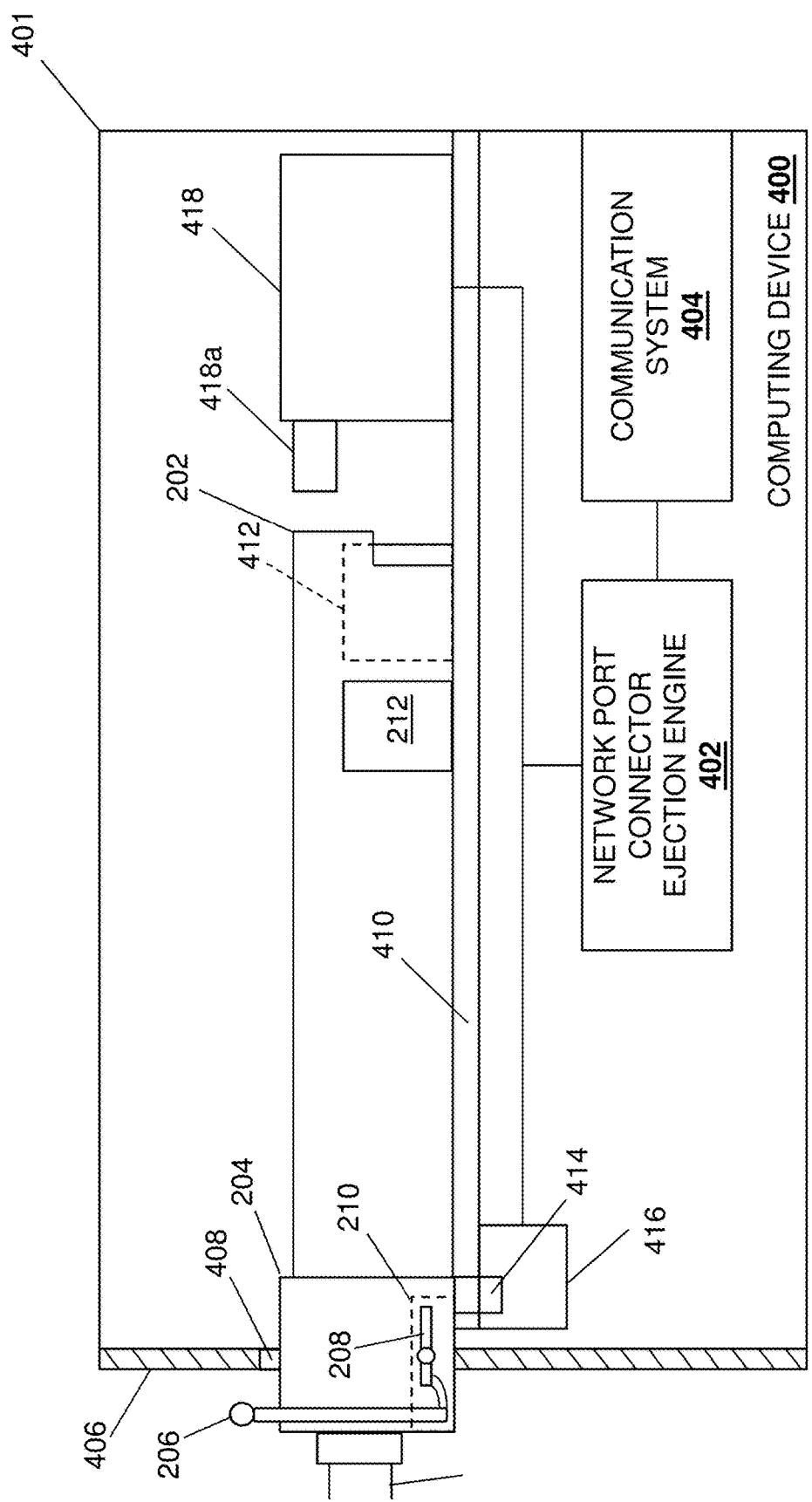
FIG. 7G is a schematic view illustrating an embodiment of the computing device of FIG. 4 having ejected the network port connector device of FIGS. 2A and 2B during the method of FIG. 6.

For example, in embodiments in which the network port connector ejection subsystem 418 is provided by a solenoid subsystem, at block 608 the network port connector ejection engine 402 may provide power to the solenoid subsystem included in the network port connector ejection subsystem 418 in order to cause the network port connector ejection member 418a to move in the direction D and into engagement with the base 202 of the network port connector device 200 to disconnect the network port connector 212 from the computing device connector 412. However, while a specific network port connector ejection mechanism is described, one of skill in the art in possession of the present disclosure will appreciate that a variety of mechanisms may be utilized to disconnect the network port connector 212 from the computing device connector 412 while remaining within the scope of the present disclosure as well. Furthermore, one of skill in the art in possession of the present disclosure will recognize that the distance that the network port connector device 200 is moved may be relatively short (e.g., a few millimeters) in order to break the connection between the network port connector 212 and the computing device connector 412. As illustrated in FIG. 7G, subsequent to the disconnection of the network port connector 212 from the computing device connector 412, the network port connector ejection engine 402 may stop actuating the retention device release subsystem 416 and the network port connection ejection subsystem 418.

Figure 8C:
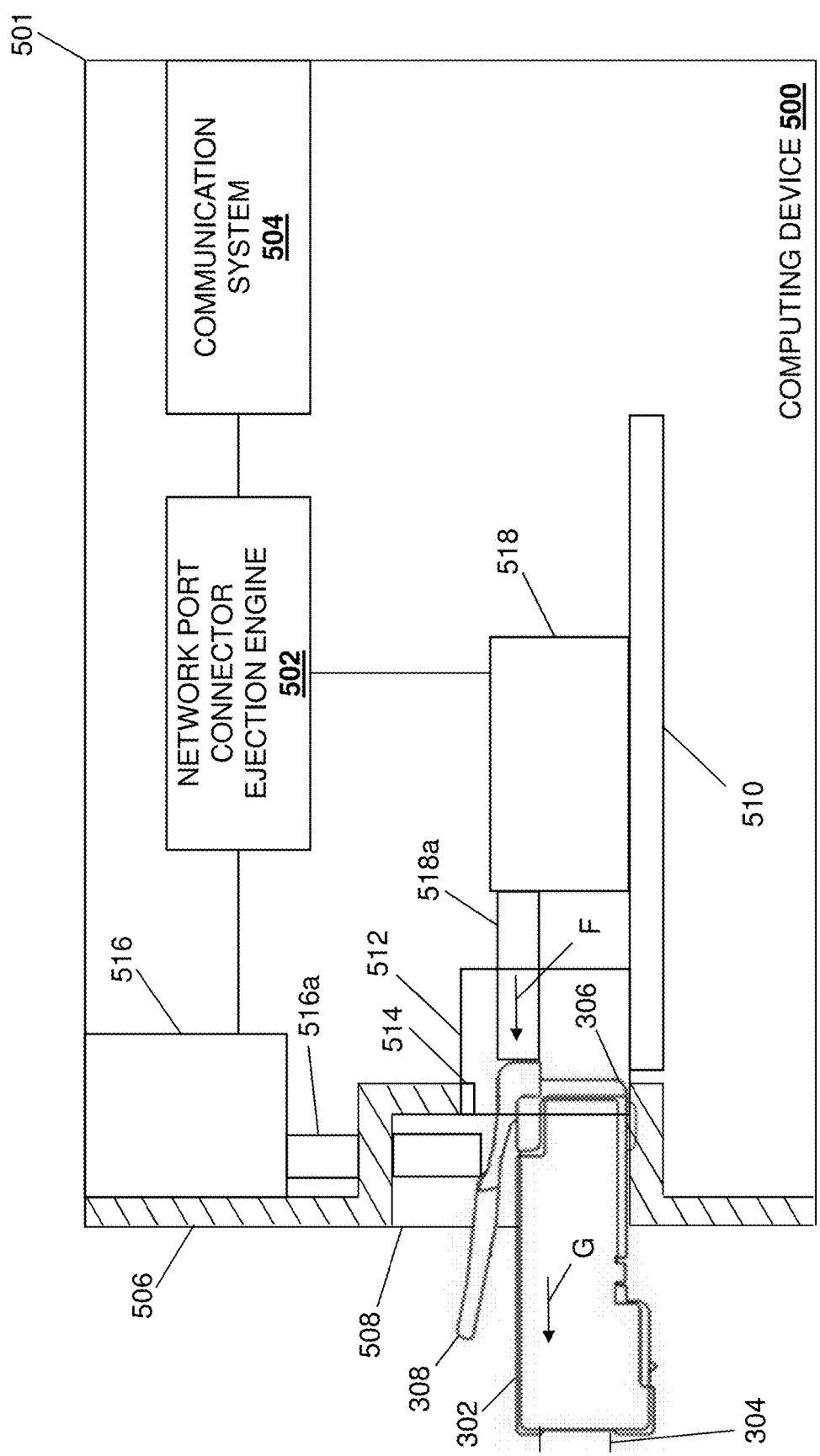
FIG. 8C is a schematic view illustrating an embodiment of the computing device of FIG. 5 operating during the method of FIG. 6 to eject the network port connector device of FIG. 3.

With reference to FIG. 8C, in an embodiment of block 608, in response to receiving the instruction to eject the network port connector 306, and following the actuation of the retention device release subsystem 516 to disengage the retention device 514 from the network port connector system 300, the network port connector ejection engine 502 may actuate the network port connector ejection subsystem 518 to cause the network port connector ejection member 518a to move in a direction F and into engagement with the base 302 of the network port connector system 300. As can be seen in FIG. 8C, the engagement of the network port connector ejection member 518a with the base 302 of the network port connector system 300 and the continued movement of the network port connector ejection member 518a (i.e., in the direction F) causes the base 302 of the network port connector system 300 to move in a direction G relative to the computing device connector 512 such that the network port connector 306 is disconnected from the computing device connector 512. As will be appreciated by one of skill in the art in possession of the present disclosure, the disengagement of the retention device 514 from the network port connector system 300 allows for the movement of the network port connector system 300 in the direction G in order to disconnect the network port connector 306 from the computing device connector 512.

Figure 8D:
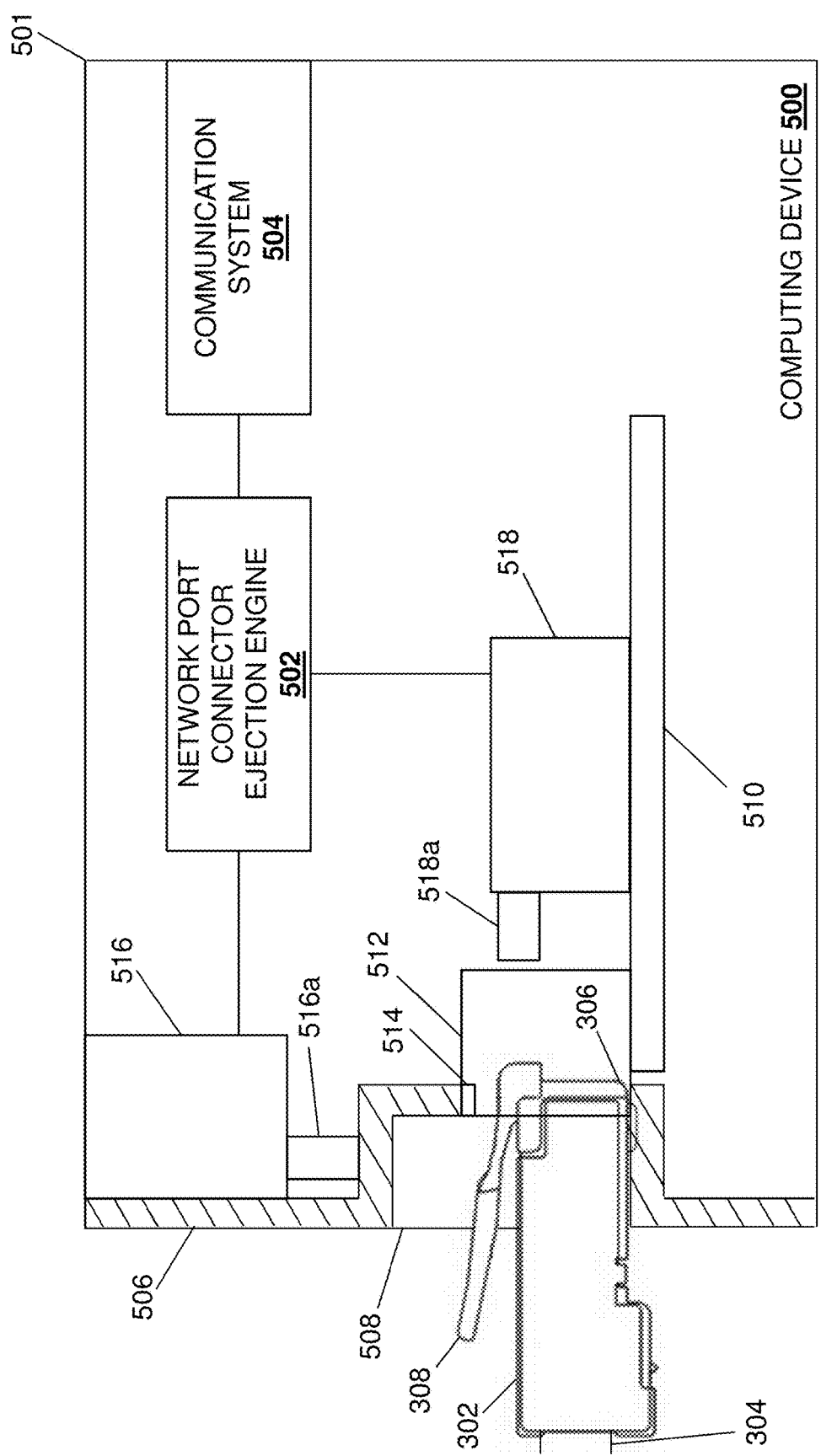
FIG. 8D is a schematic view illustrating an embodiment of the computing device of FIG. 5 having ejected the network port connector device of FIG. 3 during the method of FIG. 3.

For example, in embodiments in which the network port connector ejection subsystem 518 is provided by a solenoid subsystem, at block 608 the network port connector ejection engine 502 may provide power to the solenoid subsystem included in the network port connector ejection subsystem 518 in order to cause the network port connector ejection member 518a to move in the direction F and into engagement with the base 302 of the network port connector device 300 to disconnect the network port connector 306 from the computing device connector 512. However, while a specific network port connector ejection mechanism is described, one of skill in the art in possession of the present disclosure will appreciate that a variety of mechanisms may be utilized to disconnect the network port connector 306 from the computing device connector 512 while remaining within the scope of the present disclosure as well. Furthermore, one of skill in the art in possession of the present disclosure will recognize that the distance that the network port connector system 300 (e.g., the base 302) is moved may be relatively short (e.g., a few millimeters) in order to break the connection between the network port connector 306 and the computing device connector 512. As illustrated in FIG. 8D, subsequent to the disconnection of the network port connector 306 from the computing device connector 512, the network port connector ejection engine 502 may stop actuating the retention device release subsystem 516 and the network port connection ejection subsystem 518.

While the examples above illustrated and describe a situation in which a single network port connector is ejected, one of skill in the art in possession of the present disclosure will appreciate that computing devices may include multiple network port connectors connected to respective computing device connectors included in the computing device. As such, one of skill in the art in possession of the present disclosure will appreciate how the teachings of the present disclosure may be applied to such systems to eject multiple network port connectors (e.g., at the same time) while remaining within the scope of the present disclosure as well.

Thus, systems and methods have been described that provide the ability to remotely physically eject an SFP transceiver device in order disconnect that SFP transceiver device from a server device connector in a manner that prevents reconnection of the SFP transceiver device and the server device connector without being physically present at the server device. For example, a server device may include a server device connector that is configured to connect to an SFP transceiver device, and a retention device that is configured to engage the SFP transceiver device to secure the SFP transceiver device to the server device connector. A retention device release subsystem is provided in the server device coupled to the retention device, and is configured to be actuated to release the retention device from engagement with the SFP transceiver device, and a SFP transceiver device ejection subsystem is provided in the server device and is configured to engage the SFP transceiver device (while the retention device release subsystem is actuated to release the retention device from engagement with the SFP transceiver device) to disconnect the SFP transceiver device from the server device connector. As such, network access to a compromised or unauthorized server device may be prevented in a manner that requires physical access to the server device to regain network access, and without powering down the server device such that remote troubleshooting of the server device using a remote access controller and via a secure management network is available.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A network port connector ejection system, comprising:
a computing device connector that is configured to connect to a network port connector and that is coupled to a processing system, wherein network communications are provided to and from the processing system via the computing device connector;
a retention device that is configured to engage the network port connector to secure the network port connector to the computing device connector;
a communication system that is coupled to a network and the processing system;
a retention device release subsystem that is coupled to the retention device and the communication system and that is configured, in response to receiving an instruction received through the network via the communication system to disconnect the network port connector from the computing device connector, to be actuated to release the retention device from engagement with the network port connector; and
a network port connector ejection subsystem that is coupled to the communication system and that is configured, in response to the receiving the instruction through the network via the communication system to disconnect the network port connector from the computing device connector, following the actuation of the retention device release subsystem, and while the retention device release subsystem is actuated to release the retention device from engagement with the network port connector, to engage the network port connector to disconnect the network port connector from the computing device connector, wherein the disconnection of the network port connector from the computing device connector causes the computing device connector to cease communication through any network while the processing system communicates with the network via the communication system.

2. The system of claim 1, wherein the network port connector is a Small Form-factor Pluggable (SFP) transceiver device.

3. The system of claim 1, wherein the retention device includes a metal material, and wherein the retention device release subsystem includes an electromagnet device that is configured to attract the metal material in the retention device to cause the retention device to move and release from engagement with the network port connector.

4. The system of claim 1, wherein the network port connector ejection subsystem includes a solenoid device having a network port connector engagement member that is configured, when the network port connector ejection system is actuated, to engage the network port connector to disconnect the network port connector from the computing device connector.

5. The system of claim 1, wherein the network port connector is an Ethernet cable connector.

6. An Information Handling System (IHS), comprising:
a processing system; and
a communication system that is coupled to the processing system;
a memory system that is coupled to the processing system and that includes instructions that, when executed by the processing system, cause the processing system to provide a network port connector ejection engine that is configured to:
receive, through a network via the communication system, an instruction to eject a network port connector that is connected to a computing device connector;
actuate, in response to receiving the instruction to eject the network port connector, a retention device release subsystem that is coupled to a retention device to release the retention device from engagement with the network port connector; and
actuate, in response to receiving the instruction to eject the network port connector, following the actuation of the retention device release subsystem, and while the retention device release subsystem is actuated to release the retention device from engagement with the network port connector, a network port connector ejection subsystem to engage the network port connection ejection subsystem with the network port connector to disconnect the network port connector from the computing device connector, wherein the disconnection of the network port connector from the computing device connector causes the computing device connector to cease communication through any network while the processing system communicates with the network via the communication system.

7. The IHS of claim 6, wherein the network port connector is a Small Form-factor Pluggable (SFP) transceiver device.

8. The IHS of claim 6, wherein the retention device includes a metal material, and wherein the retention device release subsystem includes an electromagnet device that is configured to attract the metal material in the retention device to cause the retention device to move and release from engagement with the network port connector.

9. The IHS of claim 6, wherein the network port connector ejection subsystem includes a solenoid device having a network port connector engagement member that is configured, when the network port connector ejection system is actuated, to engage the network port connector to disconnect the network port connector from the computing device connector.

10. The IHS of claim 6, wherein the network port connector is an Ethernet cable connector.

11. The IHS of claim 10, wherein the retention device release subsystem is configured to engage the Ethernet cable connector to release the retention device from engagement with the Ethernet cable connector.

12. A method for ejecting a network port connector, comprising:
receiving, by a computing device through a network via a communication system, an instruction to eject a network port connector that is connected to a computing device connector;
actuating, by the computing device in response to receiving the instruction to eject the network port connector, a retention device release subsystem that is coupled to a retention device to release the retention device from engagement with the network port connector; and
actuating, by the computing device in response to receiving the instruction to eject the network port connector, following the actuation of the retention device release subsystem, and while the retention device release subsystem is actuated to release the retention device from engagement with the network port connector, a network port connector ejection subsystem to engage the network port connection ejection subsystem with the network port connector to disconnect the network port connector from the computing device connector, wherein the disconnection of the network port connector from the computing device connector causes the computing device connector to cease communication through any network while the computing device communicates with the network via the communication subsystem.

13. The method of claim 12, wherein the network port connector is a Small Form-factor Pluggable (SFP) transceiver device.

14. The method of claim 12, wherein the retention device includes a metal material, and wherein the retention device release subsystem includes an electromagnet device that is configured to attract the metal material in the retention device to cause the retention device to move and release from engagement with the network port connector.

15. The method of claim 12, wherein the network port connector ejection subsystem includes a solenoid device having a network port connector engagement member that is configured, when the network port connector ejection system is actuated, to engage the network port connector to disconnect the network port connector from the computing device connector.

16. The method of claim 12, wherein the network port connector is an Ethernet cable connector.

17. The method of claim 16, wherein the retention device release subsystem is configured to engage the Ethernet cable connector to release the retention device from engagement with the Ethernet cable connector.

* * * * *